United States Patent
Sin et al.

(10) Patent No.: US 8,031,699 B2
(45) Date of Patent: Oct. 4, 2011

(54) CALL PROCESSING METHOD AND APPARATUS FOR MOBILE TERMINAL IN DATA CALL MODE

(75) Inventors: Oun Suk Sin, Suwon-si (KR); Sang Hyuk Im, Yongin-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 205 days.

(21) Appl. No.: 12/392,456

(22) Filed: Feb. 25, 2009

(65) Prior Publication Data

US 2009/0262672 A1    Oct. 22, 2009

(30) Foreign Application Priority Data

Apr. 21, 2008    (KR) .................. 10-2008-0036793

(51) Int. Cl.
 *H04L 12/66* (2006.01)
 *H04L 12/28* (2006.01)
 *H04J 1/02* (2006.01)
(52) U.S. Cl. .................. 370/352; 370/493; 370/389
(58) Field of Classification Search .......... 370/352, 370/356, 389, 392, 400, 328, 329, 493, 494, 370/495; 379/17, 93.04, 93.09, 93.14, 100.15, 379/100.16; 455/101, 115.3, 133–135
See application file for complete search history.

(56) References Cited

U.S. PATENT DOCUMENTS

| | | | |
|---|---|---|---|
| 6,360,089 B1 * | 3/2002 | Saitoh .................. | 340/7.1 |
| 6,862,433 B2 * | 3/2005 | Callaway, Jr. .......... | 455/101 |
| 7,542,728 B2 * | 6/2009 | Bitran et al. ............ | 455/73 |
| 7,809,387 B2 * | 10/2010 | Chaudry et al. ........ | 455/512 |
| 2005/0245207 A1 | 11/2005 | Suzuki et al. | |
| 2006/0003772 A1 * | 1/2006 | Semper ................ | 455/452.1 |

FOREIGN PATENT DOCUMENTS

| KR | 10-0609588 B1 | 8/2006 |
|---|---|---|
| KR | 10-2007-0002156 A | 1/2007 |

\* cited by examiner

*Primary Examiner* — Hanh Nguyen
(74) *Attorney, Agent, or Firm* — Jefferson IP Law, LLP

(57) ABSTRACT

A call processing method and a mobile terminal are provided. The mobile terminal includes a Radio Frequency (RF) receiver including a first input terminal connected to a first incoming signal line and a second input terminal connected to a second incoming signal line, a first RF switch arranged on the first incoming signal line for switching the first incoming line between the first input terminal and an inter-switch line, a second RF switch arranged on the second incoming signal line for switching the second input terminal between the second incoming signal line and the inter-switch line, and a controller for controlling, in a data call session, the first RF switch and the second RF switch to establish a connection of the first incoming signal line and the second incoming signal line during a first period and during a second period.

19 Claims, 7 Drawing Sheets

CALL PROCESSING METHOD AND APPARATUS FOR MOBILE TERMINAL IN DATA CALL MODE

PRIORITY

This application claims the benefit under 35 U.S.C. §119(a) of a Korean patent application filed on Apr. 21, 2008 in the Korean Intellectual Property Office and assigned Serial No. 10-2008-0036793, the entire disclosure of which is hereby incorporated by reference.

BACKGROUND OF THE INVENTION

1. Field of the Invention

The present invention relates to a mobile terminal. More particularly, the present invention relates to a call processing method and apparatus for a mobile terminal for effectively detecting an incoming call while the mobile terminal operates in a data call mode.

2. Description of the Related Art

The Code Division Multiple Access (CDMA) mobile communication system, as voice communication-focused, has evolved into $3^{rd}$ Generation (3G) technologies supporting high speed data communication that are developed under the International Mobile Telecommunication 2000 (IMT-2000).

In the CDMA system, a transmitter sends modulated signals to a receiver through a radio channel. The receiver receives transmission signals through more than one propagation path and experience distortion as the signals travel in frequency selective multipath fading channels. In order to solve the distortion problems, various diversity technologies are adopted. The diversity technologies include a method for improving reliability of a radio signal by combining different versions of the signal received through two antennas.

However, conventional diversity methods adopted for mobile terminals have a drawback in that the mobile terminal consumes excessive energy while processing an incoming call in a data call mode, resulting in reduction of standby time and active time.

Therefore, a need exists for a mobile terminal and an incoming call processing method for the mobile terminal for reducing power consumption while processing an incoming call.

SUMMARY OF THE INVENTION

An aspect of the present invention is to address at least the above-mentioned problems and/or disadvantages and to provide at least the advantages described below. Accordingly, an aspect of the present invention is to provide a call processing method and apparatus for a mobile terminal operating in data call mode for periodically determining a receipt of an incoming call by means of switches interposed between a duplexer and a Radio Frequency (RF) receiver.

In accordance with an aspect of the present invention, a mobile terminal is provided. The mobile terminal includes a Radio Frequency (RF) receiver which includes a first input terminal connected to a first incoming signal line and a second input terminal connected to a second incoming signal line, a first RF switch which is arranged on the first incoming signal line for switching the first incoming line between the first input terminal and an inter-switch line, a second RF switch which is arranged on the second incoming signal line for switching the second input terminal between the second incoming signal line and the inter-switch line, and a controller for controlling, in a data call session, the first RF switch and the second RF switch to establish a connection of the first incoming signal line to the first input terminal and a connection of the second incoming signal line to the second input terminal, respectively, during a first period, and to establish a connection of the first incoming signal line to the second input terminal through the inter-switch line during a second period.

In accordance with another aspect of the present invention, an incoming call processing method for a mobile terminal is provided. The method includes establishing, in a data call session, a first connection of a first incoming signal line to a first input terminal via a first Radio Frequency (RF) switch and a second connection of a second incoming signal line to a second input terminal via a second RF switch, simultaneously during a first period, establishing a third connection by switching an output of the first incoming signal line from the first input terminal to an input of the second switch during a second period, and determining whether an incoming voice call is received based on a signal input through the second input terminal during the second period.

In accordance with still another aspect of the present invention, a mobile terminal is provided. The mobile terminal includes a first diplexer and a second diplexer, each for separating a first band signal and a second band signal from a frequency band, a Radio Frequency (RF) receiver which includes a first band first input terminal and a second band first input terminal and a first band second input terminal and a second band second input terminal, a first band first RF switch which switches the first band signal input through a first incoming signal line connected to the first diplexer between the first band first input terminal and a first inter-switch line, a second band first RF switch which switches the second band signal input through the second incoming signal line connected to the first diplexer between the second band first input terminal and a second inter-switch line, a first band second RF switch which switches the first band second input terminal between a third incoming signal line connected to the second diplexer and the first inter-switch line, a second band second RF switch which switches the second band second input terminal between a fourth incoming signal line connected to the second diplexer and the second inter-switch line, and a controller for controlling, in a data call session, the first RF switches to establish connections of the first incoming signal line and the second incoming signal line to the respective first input terminals and controls the second RF switches to establish connections of the third incoming signal line and the fourth incoming signal line to the respective second input terminals during a first period, and for controlling the first RF switches to establish connections of the first incoming signal line and the second incoming signal line to the respective second input terminals through the respective first inter-switch line and the second inter-switch line during a second period.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

In the following description, a mobile terminal is provided with multiple receivers to improve reliability of signal reception with diversity gain. The mobile terminal may by any of a Personal Digital Assistant (PDA), a Smartphone, an International Mobile Telecommunication (IMT) 2000 terminal and their equivalent device, equipped with two or more Radio Frequency (RF) receivers. The mobile terminal may have a display equipped with a partial touchscreen or a full touchscreen.

The call processing method and apparatus of the present invention may be adopted for an Evolution Data Only (EVDO) communication system which is a standard for high speed wireless broadband.

Figure 1:
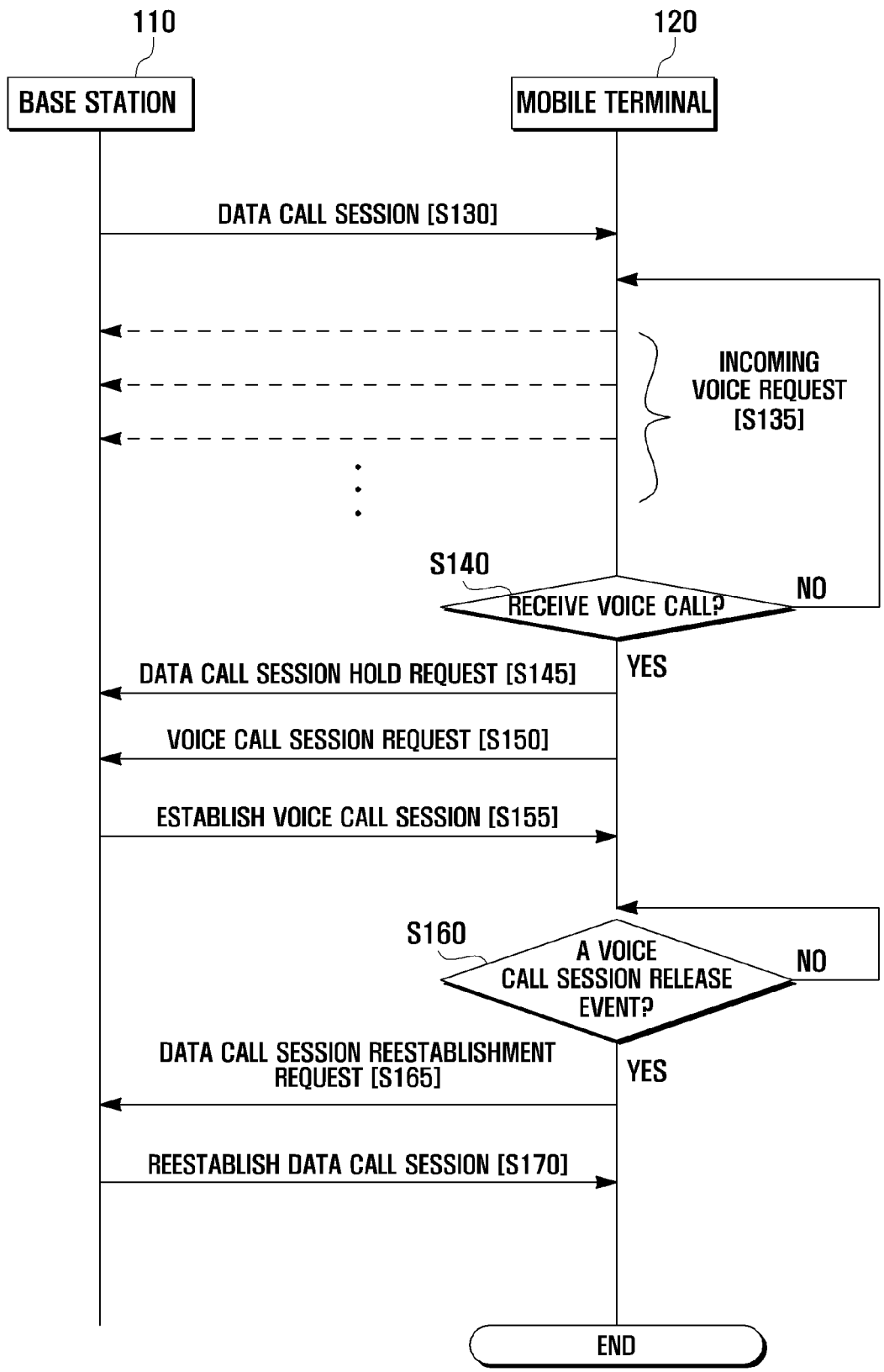
FIG. 1 is a message flow diagram illustrating a call processing method of a mobile terminal operating in data call mode according to an exemplary embodiment of the present invention.

FIG. 1 is a message flow diagram illustrating a call processing method of a mobile terminal operating in data call mode according to an exemplary embodiment of the present invention. In the call processing method, the mobile terminal determines a receipt of an incoming call while the mobile terminal is operating in the data call mode.

In FIG. 1, a base station 110 provides a mobile terminal 120 with a data communication service in response to a request by the mobile terminal 120 in step S130. While being served by the base station 110, the mobile terminal 120 determines whether an incoming voice call request message is received periodically by controlling a RF switch in step S135. If an incoming voice call request message is detected in step S140, the mobile terminal 120 sends a data call session hold request message in step S145 and sequentially sends a voice call session request message to the base station 110 in step S150. Upon receipt of the voice call session request message, the base station 110 pauses the data call session and sends a voice call establishment response message to establish a voice call session with the mobile terminal 120 in step S155. While operating in the voice call mode, the mobile terminal determines whether a voice call session release event is detected in step S160. If a voice call session release event is detected, the mobile terminal 120 sends a data call session reestablishment request message to the base station 110 in step S165. Upon receipt of the data call session reestablishment request message, the base station 110 sends a data call session reestablishment response message such that a phased data call session is restarted in step S170.

Figure 2:
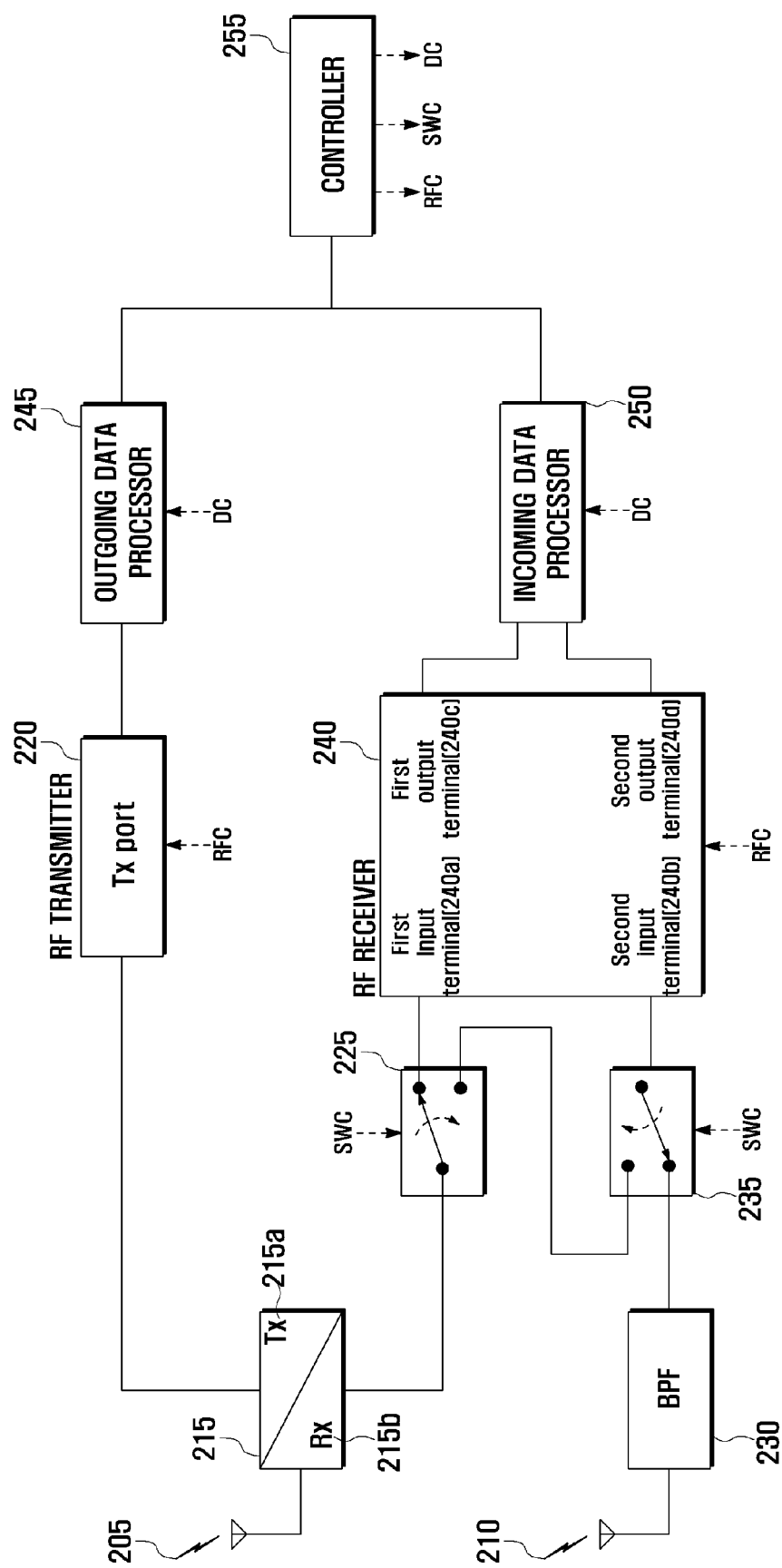
FIG. 2 is a block diagram illustrating a configuration of a call processing unit of a mobile terminal according to an exemplary embodiment of the present invention.

FIG. 2 is a block diagram illustrating a configuration of a call processing unit of the mobile terminal of FIG. 1.

As illustrated in FIG. 2, the mobile terminal 120 includes a first antenna 205 and a second antenna 210, a duplexer 215, a Radio Frequency (RF) transmitter 220, a Band Path Filter (BPF) 230, a first RF switch 225 and a second RF switch 235, an RF receiver 240, an outgoing data processor 245, an incoming data processor 250 and a controller 255. Conventional components of the mobile terminal (such as, an input unit, a display unit and an audio processing unit) that are out of the scope of the exemplary embodiments of the present invention are omitted in the drawing and description to not obscure the invention.

In this exemplary embodiment, the signal path formed with the first antenna 205, the duplexer 215, the first RF switch 225 and the RF receiver 240 is called the first reception path. The signal path formed with the second antenna 210, the BPF 230, the second RF switch 235 and the RF receiver 240 is called the second reception path.

Referring to FIG. 2, the first antenna 205 and the second antenna 210 receives the modulated signal transmitted by the base station 110. The mobile terminal 120 obtains diversity gain by switching between receiving antennas for receiving the strongest signal or combining the signals received via multiple receiving antennas. The signal received by the first antenna is transferred to the duplexer 215 and the signal received by the second antenna is transferred to the BPF 230.

The duplexer 215 separates transmission and reception frequencies within substantially the same band and is provided with a transmit (Tx) section 215a and a receive (Rx) section 215b. The Tx section 215a transmits the signal output by the RF transmitter 220 through the first antenna 205 and the Rx section transfers the signal received by the first antenna 205 to the first RF switch 225.

The RF transmitter 220 up-converts a baseband signal to the RF signal and outputs the RF signal to the Tx section 215a of the duplexer 215.

The first RF switch 225 is arranged between the duplexer 215 and the RF receiver 240 such that when the mobile terminal operates in the idle mode or the voice call mode, the first RF switch 225 switches the first incoming signal line, which is input from the duplexer 215, to an output terminal connected to a first input terminal of the RF receiver 240. Otherwise, when the mobile terminal operates in the data call mode, the first RF switch 225 switches the first incoming signal line to a terminal connected to a first input terminal of the second RF switch 235 in response to a control signal for determining a receipt of an incoming voice call (the detailed switching operation is described later).

The BPF 230 passes specific band signals received by the second antenna 210.

In this exemplary embodiment, the second RF switch 235 is arranged between the BPF 230 and the RF receiver 240. In a case where the BPF is not applied, the second RF switch 235 may be arranged between the second antenna 210 and the RF receiver 240. When the mobile terminal operates in the idle mode or the voice call mode, the second RF switch 235 switches a second input terminal of the RF receiver 240 to its second input terminal connected to the BPF 230. Otherwise, when the mobile terminal operates in the data call mode, the second RF switch 235 switches the second input terminal of the RF receiver 240 to its first input terminal connected to the second output terminal of the first RF switch 225 (the detailed switching operation is described later).

The RF receiver 240 includes a first input terminal 240a connected to the first output terminal of the first RF switch 225, a first output terminal 240c connected to a first input terminal of the incoming data processor 250, a second input terminal 240b connected to the second RF switch 235 and a second output terminal 240d connected to a second input terminal of the incoming data processor 250.

The outgoing data processor 245 is provided with a coder (not shown) for coding the transmission signal, a modulator for modulating the coded signal and a digital-analog converter for converting the modulated signal into an analog signal. The coder includes a data coder for processing packet data and an audio coder for processing audio signal including voice. The outgoing data processor 245 outputs the analog signal to the RF transmitter 220.

The incoming data processor 250 is provided with an analog-digital converter (not shown) for converting the analog signal output from the first output terminal 240c and the second output terminal 240d of the RF receiver 240, a demodulator (not shown) for demodulating the signal and a decoder (not shown) for decoding the demodulated signal. The decoder may include a data decoder for decoding packet data and an audio decoder for decoding audio data including voice. The incoming data processor 250 outputs the decoded signal to the controller 255.

The controller 255 controls general operations of the mobile terminal and signaling among the internal components.

More particularly, the controller 255 may be configured to obtain the diversity gain such that the signal, of the signals input through the first incoming line and the second incoming line, has an amplification gain that is greater than other signals. Also, the controller 255 may be configured to obtain the diversity gain such that the signals input through the first incoming line and the second incoming line are combined.

The controller 255 generates an RF Control (RFC) signal for controlling the RF transmitter 220 and the RF receiver 240. The controller 255 also generates Data Control (DC) signal for controlling the outgoing data processor 245 and the incoming data processor 250.

The controller 255 further generates a Switch Control (SWC) signal for controlling the first RF switch 225 and the second RF switch 235. The SWC is generated with a value determined depending on the operation mode of the mobile terminal, i.e., idle mode, voice call mode and data call mode.

When the mobile terminal operates in the idle mode or the voice call mode, the controller 255 outputs an SWC signal to the first RF switch 225 and the second RF switch 235 such that the signals input through the first incoming signal line and the second incoming signal line are connected to the first input terminal 240a and the second input terminal 240b, respectively. If the SWC signal is applied, then the first RF switch 225 establishes a connection between the Rx section 215b of the duplexer 215 and the first input terminal 240a of the RF receiver 240 and a connection between the second antenna 210 and the second input terminal 240b of the RF receiver 240.

Whereas, when the mobile terminal operates in the data call mode, the controller 255 outputs an SWC signal to the first RF switch 225 and the second RF switches 235 such that a second output terminal of the first RF switch 225 is connected to a first input terminal of the second RF switch 235 via an inter-switch line, resulting in a signal line between the first antenna 205 and the second input terminal 240b of the RF receiver 240.

If the SWC signal is applied, then the first RF switch 225 switches the connection of its input terminal from its first output terminal connected to the first input terminal 240a of the RF receiver 240 to its second output terminal connected to a first input terminal of the second switch 235. The second RF switch 235 switches the connection of its output terminal connected to the second input terminal 240b of the RF receiver 240 from its second input terminal connected to the second antenna 210 to its first input terminal connected to the second output terminal of the first RF switch 225.

In this case, the controller 255 determines whether an incoming voice call is received, based on the signal input through its second input terminal 240b of the RF receiver 240. If an incoming call is detected, then the controller 255 pauses a current data call session and performs a voice call processing procedure. If no incoming call is detected, then the controller 255 maintains the data call session and outputs the SWC signal periodically for determining a receipt of the incoming voice call.

Figure 3:
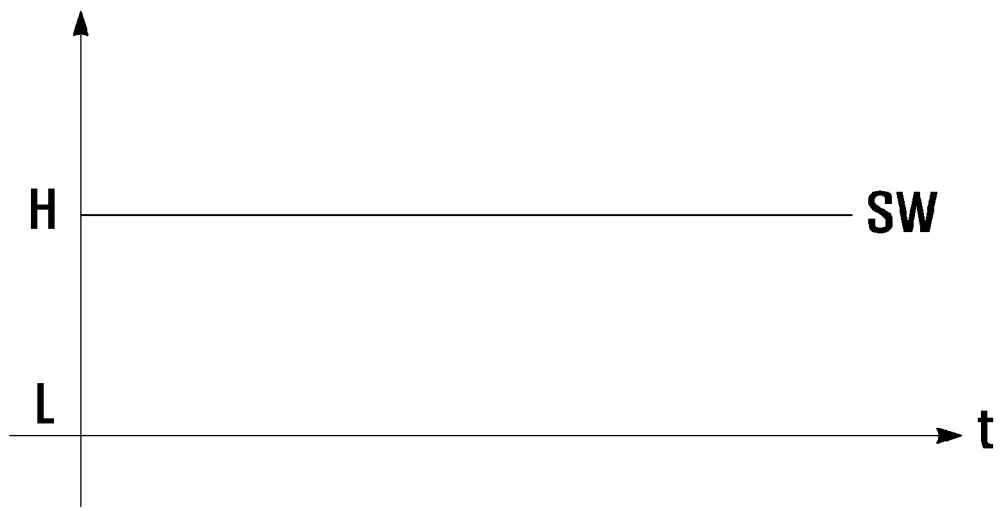
FIG. 3 is a graph illustrating a waveform of a SWitch Control (SWC) signal generated by a controller in an idle mode according to an exemplary embodiment of the present invention.
Figure 4:
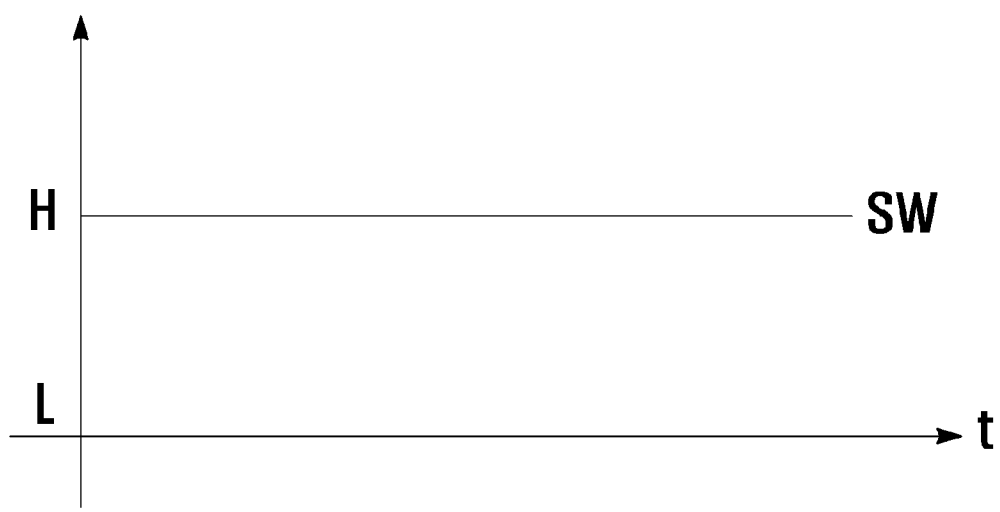
FIG. 4 is a graph illustrating a waveform of a SWC signal generated by a controller in a voice call mode according to an exemplary embodiment of the present invention.
Figure 5:
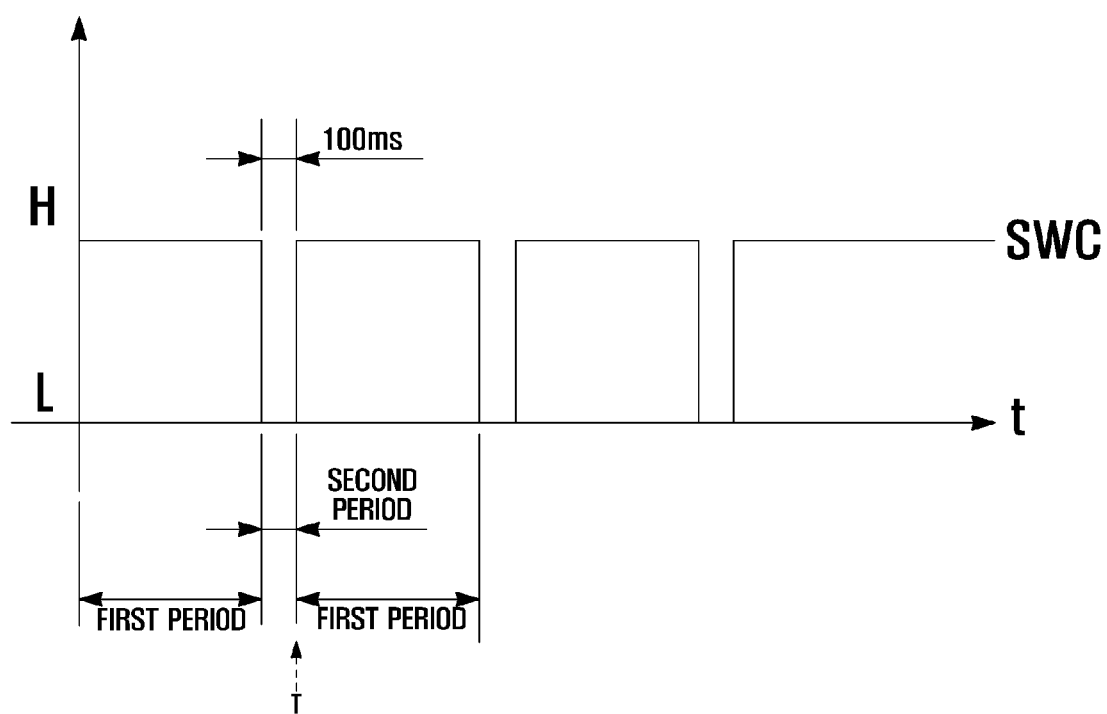
FIG. 5 is a graph illustrating a waveform of a SWC signal generated by a controller in a data call mode according to an exemplary embodiment of the present invention.

FIGS. 3, 4 and 5 are graphs illustrating waveforms of the SWC signal generated by the controller of FIG. 2 in an idle mode, a voice call mode and a data call mode, respectively, according to exemplary embodiments of the present invention.

As illustrated in FIG. 3, the controller 255 outputs a SWC signal having a constant preset level in the idle mode. While operating in the idle mode, the controller 255 outputs the SWC signal to the first switch 225 and the second RF switch 235 such that the signal received by the first antenna 205 is input to the first input terminal 240a of the RF receiver 240 and the signal received by the second antenna 210 is input to the second input terminal 240b of the RF receiver 240. In this case, the SWC signal maintains a high level.

As illustrated in FIG. 4, in the voice call mode, the controller 255 outputs the SWC signal having the constant level to the first RF switch 225 and the second RF switch 235 such that the signal received by the first antenna 205 is input to the first input terminal 240a of the RF receiver 240 and the signal received by the second antenna 210 is input to the second input terminal 240b of the RF receiver 240. In this case, the SWC signal maintains a high level. In this case, the SWC signal level is high as illustrated in FIG. 4.

Meanwhile, when the mobile terminal 120 operates in the data call mode, the controller 255 outputs the SWC signal periodically for determining a receipt of an incoming voice call.

As illustrated in FIG. 5, in the data call mode, the controller 255 outputs the SWC signal having a high level to the first RF switch 225 and the second RF switch 235 during a first period such that the signal received by the first antenna 205 is input to the first input terminal 240a of the RF receiver 240 and the signal received by the second antenna 210 is input to the second input terminal 240b of the RF receiver 240. The first period may be set to 1.28 seconds, 2.56 seconds or 5.12 seconds. After the first period expires, the controller 255 outputs the SWC signal having a low level to the first RF switch 225 and the second RF switch 235 during a second period such that the signal received by the first antenna 205 is input to the second input terminal 240b of the RF receiver 240 via the first antenna 225 and the second antenna 235. Here, the second period may be set to about 100 ms. If it is determined that no incoming voice call is received, the controller 255 outputs the SWC signal having a high level to the first RF switch 225 and the second RF switch 235 during the next first period such that the signal received by the first antenna 205 is input to the first input terminal 240a of the RF receiver 240 and the signal received by the second antenna 210 is input to the second input terminal 240b of the RF receiver 240. In this manner, the controller 255 generates the SWC signal with a level that alternates between high and low states.

Figure 6:
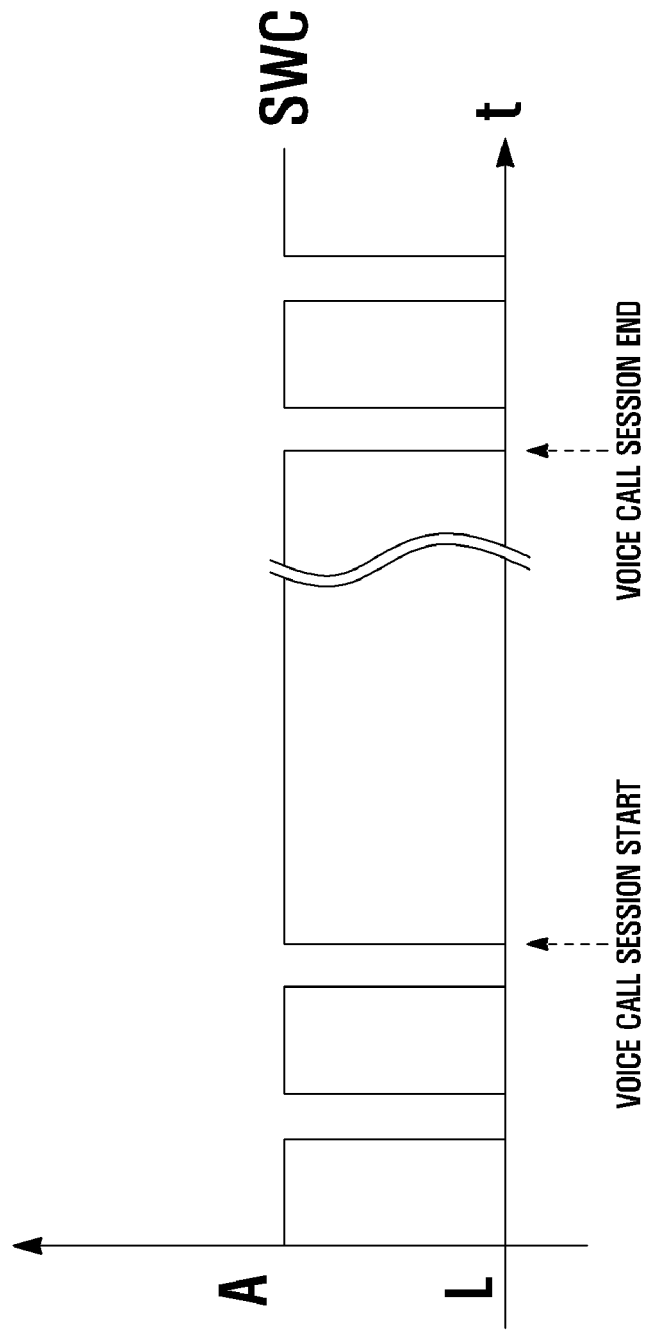
FIG. 6 is a graph illustrating a waveform of a SWC signal generated by a controller when a voice call is received during a data communication session according to an exemplary embodiment of the present invention.

FIG. 6 is a graph illustrating a waveform of the switch control (SWC) signal generated by the controller of FIG. 2 when a voice call is received during a data communication session.

When the mobile terminal operates in the data call mode, the controller 255 outputs the SWC signal for determining a receipt of incoming voice call to the first RF switch 225 and the second RF switch 235, as shown in FIG. 5. If an incoming voice call is detected in the data call mode, the controller 255 establishes a voice call session and outputs the SWC signal having the high level to the first RF switch 225 and second RF switch 235 during the voice call session as illustrated in FIG. 6. Accordingly, the signal received by the first antenna 205 is input to the first input terminal 240a of the RF receiver 240 and the signal received by the second antenna 210 is input to the second input terminal 240b of the RF receiver 240. If a voice call session termination event is detected, the controller 255 restarts the terminated voice call session and outputs the SWC signal with a level alternated between high and low states periodically.

Figure 7:
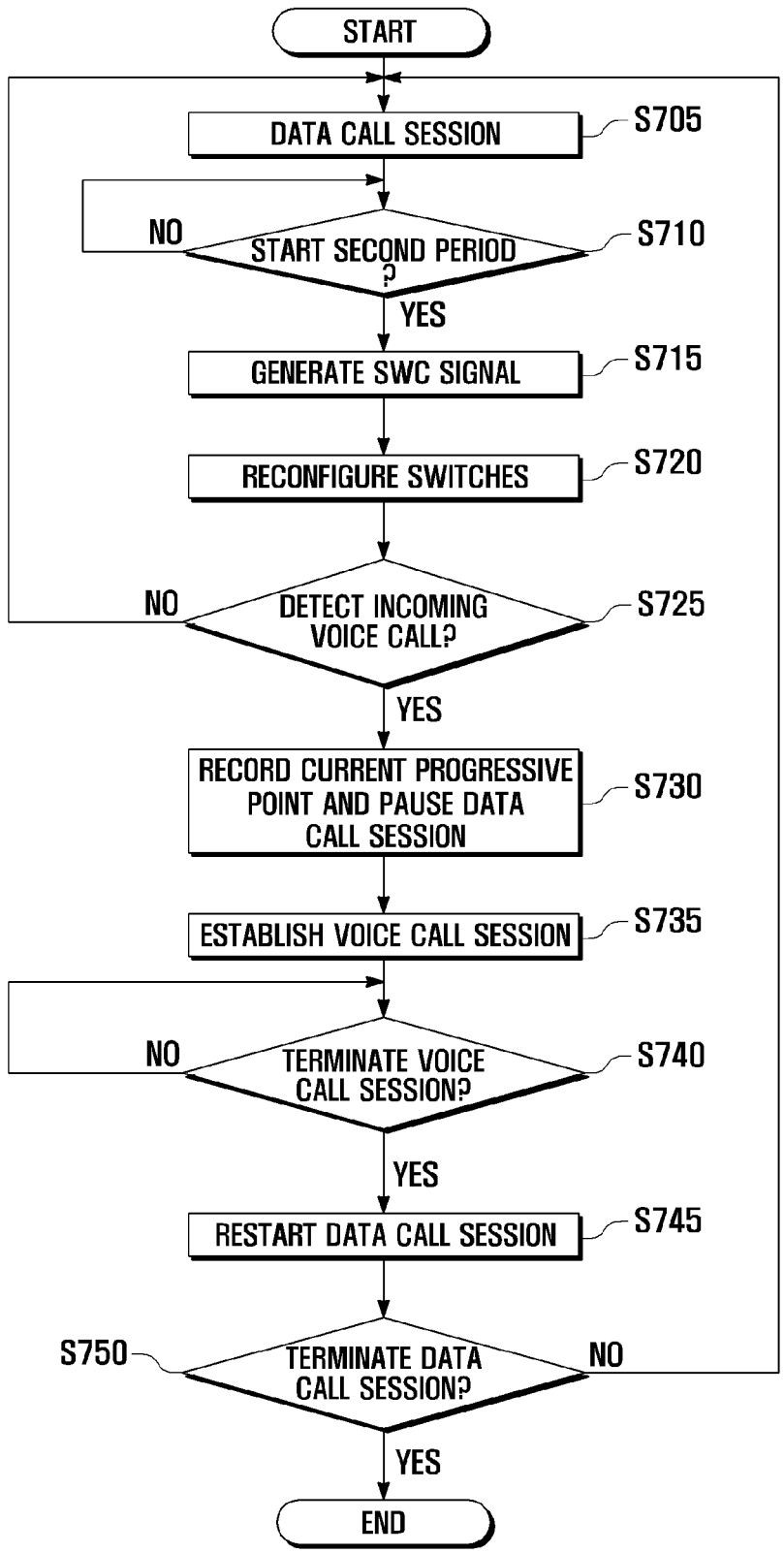
FIG. 7 is a flowchart illustrating a call processing method for a mobile terminal operating in a data call mode according to an exemplary embodiment of the present invention.

FIG. 7 is a flowchart illustrating a call processing method for a mobile terminal operating in a data call mode according to an exemplary embodiment of the present invention.

Referring to FIG. 7, the controller 255 determines whether the mobile terminal operates in the data call mode in step S705 and detects a start point of the second period in step S710. If the start point of the second period is detected, the controller 255 outputs the SWC signal with levels that drop from high to low in step S715, as illustrated in FIG. 5.

In step S720, when the high-to-low SWC signal is applied, the first RF switch 225 switches its input terminal from its first output terminal connected to the first input terminal 240a of the RF receiver 240 to its second output terminal. Also, in step S720, the second RF switch 235 switches its single output terminal connected to the second input terminal 240b of the RF receiver 240 from its second input terminal to its first input terminal in step S720, such that the second output terminal of the first RF switch 225 is connected to the first input terminal of the second RF switch 235, whereby the signal received by the first antenna 205 is input to the second input terminal 240b of the RF receiver 240. The connection between the second output terminal of the first RF switch 225 and the first input terminal of the second RF switch 235 are released at an end point of the second period.

After establishing the signal line between the first antenna 205 and the second input terminal 240b of the RF receiver 240, the controller 255 determines whether an incoming voice call is received in step S725. If no incoming voice call is received, the controller 255 repeats steps S705 to S725.

Otherwise, if an incoming voice call is received, the controller 255 records a current progressive point of the data call session and pauses the data call session in step S730. The controller 255 processes the voice call to establish a voice call session in step S735. During the voice call session, the controller 255 determines whether a voice call termination event is detected in step S740. If a voice call termination event is detected, the controller 255 ends the voice call session and restarts the data call session from the recorded progressive point of the data call session in step S745. The controller 255 determines whether a data call session termination event is detected in step S750. If a data call session termination event is detected, the controller 255 ends the data call session. Otherwise, if no data call session termination event is detected, the controller 255 repeats steps S705 to S750.

Figure 8:
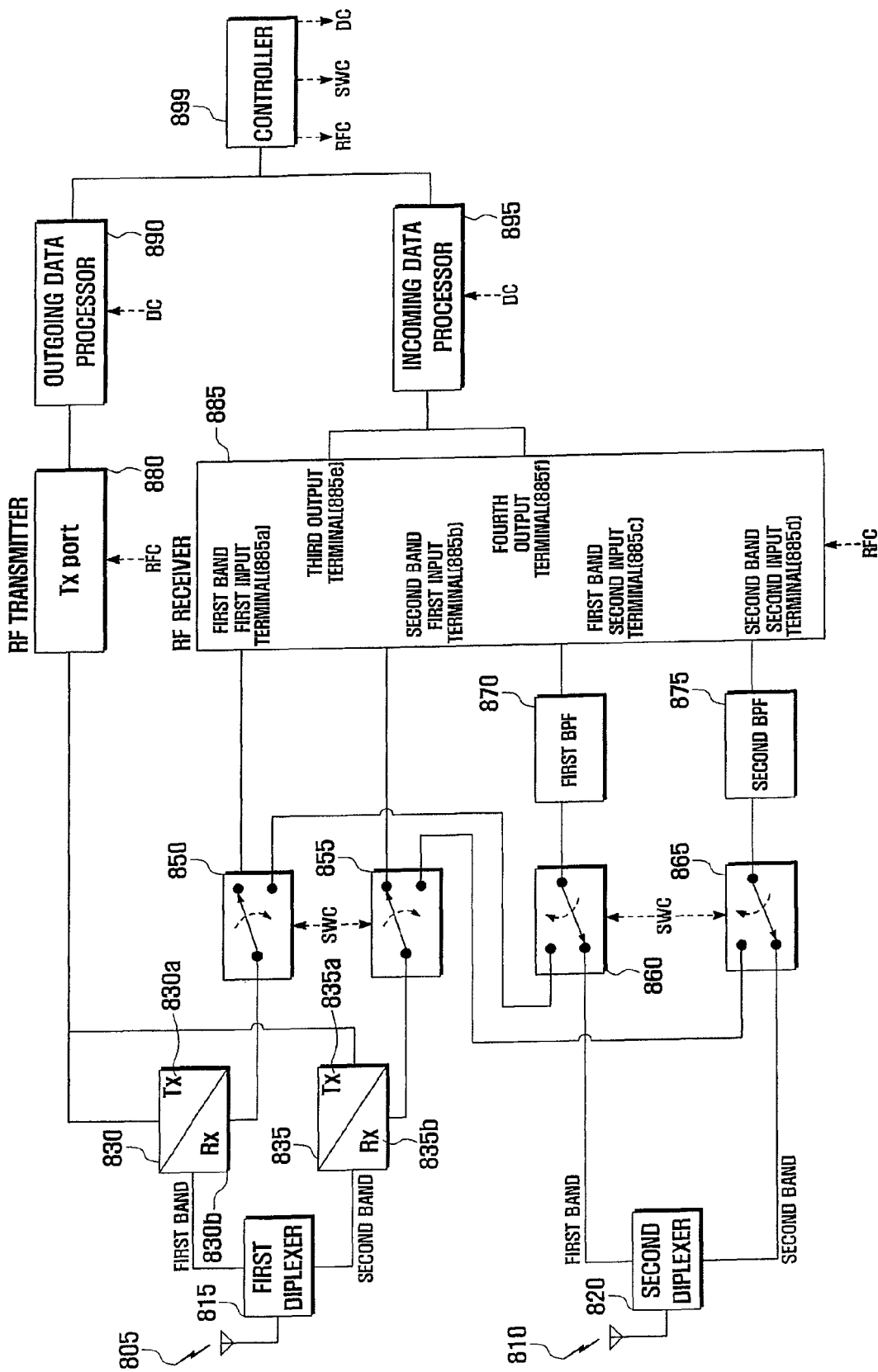
FIG. 8 is a block diagram illustrating a configuration of a call processing unit of a dual-band mobile terminal according to an exemplary embodiment of the present invention.

FIG. 8 is a block diagram illustrating a configuration of a call processing unit of a dual-band mobile terminal according to an exemplary embodiment of the present invention.

Referring to FIG. 8, the dual-band mobile terminal includes a first antenna 805 and a second antenna 810, a first diplexer 815 and a second diplexer 820, a first duplexer 830, a second duplexer 835, a first band first RF switch 850, a second band first RF switch 855, a first band second RF switch 860, a second band second RF switch 865, a first BPF 870, a second BPF 875, an RF transmitter 880, an RF receiver 885, an outgoing data processor 890, an incoming data processor 895 and a controller 899. Well-known components of the dual-mode mobile terminal (such as, an input unit, a display unit and an audio processing unit) that are out of the scope of the exemplary embodiments of the present invention are omitted in the drawing and description to not obscure the invention. Also, the descriptions of the same components as depicted in FIG. 2 are omitted to avoid redundancy.

In the following description, a first incoming signal line is formed between the first antenna 805 and the first band first RF switch 850 via the diplexer 815 and the first duplexer 830, a second incoming signal line is formed between the first antenna 805 and the second band first RF switch 855 via the diplexer 815 and the second duplexer 835, a third incoming signal line is formed between the second antenna 810 and the first band second RF switch 860, and a fourth incoming signal line is formed between the second antenna 810 and the second band second RF switch 865.

The modulated signal transmitted by the base station 110 is received through the first antenna 805 and the second antenna 810. More particularly, the first antenna 805 and second antenna 810 are configured to receive a first frequency band signal and a second frequency band signal. The first frequency band and the second frequency band are the frequency bands assigned for two different radio communication systems. In this exemplary embodiment, it is assumed that the first frequency band and the second frequency band are a Personal Communications Service (PCS) band and a cellular band, respectively. The PCS band covers from 1850 to 1990 MHz and the cellular band covers from 824 to 894 MHz.

The first diplexer 815 is provided with a high pass filter for passing the PCS band signal and a low pass filter for passing the cellular band signal.

The first band first RF switch 850 is arranged between the first duplexer 830 and the RF receiver 885 such that when the mobile terminal 120 operates in the idle mode or the voice call mode, the PCS band signal received by the first antenna 805 is input to the RF receiver 885. Meanwhile, when the mobile terminal 120 operates in the data call mode, the first band first RF switch 850 switches the first incoming signal line to an input terminal of the first band second RF switch 860 via a first inter-switch line in response to the control signal for determining a receipt of an incoming voice call such that the PCS band signal received by the first antenna 805 is input to the RF receiver 885 via the first band second RF switch 860 and the first BPF 870 (the detailed switching operation is described later).

The second band first RF switch 855 is arranged between the second duplexer 835 and the RF receiver 885 such that when the mobile terminal 120 operates in the idle mode or the voice call mode, the cellular band signal received by the first antenna 805 is input to the RF receiver 885. Meanwhile, when the mobile terminal 120 operates in the data call mode, the second band first RF switch 855 switches the second incoming signal line to an input terminal of the second band second RF switch 865 via a second inter-switch line in response to the control signal for determining a receipt of an incoming voice call such that the cellular band signal received by the first antenna 805 is input to the RF receiver 885 via the second band second RF switch 865 and the second BPF 875 (the detailed switching operation is described later).

The operation of the first band second RF switch 860 is similar to that of the first band first RF switch 850 except that the first band second RF switch 860 is installed between the second diplexer 820 and the RF receiver 885 for switching the PCS band signal received by the second antenna 810. When the mobile terminal 120 operates in the data call mode, the first band second RF switch 860 switches its output terminal from its second input terminal connected to the second diplexer 820 to its first input terminal connected to the second output terminal of the first band first RF switch 850 via the first inter-switch line such that the PCS band signal received by the first antenna 805 is input to the RF receiver 885 via the first duplexer 830, the first band first RF switch 850, the first band second RF switch 860 and the first BPF 870.

Also, the operation of the second band second RF switch 855 is similar to that of the second band first RF switch 855 except that the second band second RF switch 865 is installed between the second diplexer 820 and the RF receiver 885 for switching the cellular band signal received by the second antenna 810. When the mobile terminal operates in the data call mode, the second band second RF switch 865 switches its output terminal from its second input terminal connected to the second diplexer 820 to its first input terminal connected to the second output terminal of the second band first RF switch 855 via the second inter-switch line such that the cellular band signal received by the first antenna 805 is input to the RF receiver 885 via the second duplexer 835, the second band first RF switch 855, the second band second RF switch 865 and the second BPF 875.

The first BPF 870 filters the first band signal output by the second diplexer 820 to output a specific sub-band signal to the RF receiver 885.

The second BPF 875 filters the second band signal output by the second diplexer 820 to output a specific sub-band signal to the RF receiver 885.

The RF receiver 885 low-noise amplifies and down-converts the signals input through the first incoming signal line and the second incoming signal line and outputs the low-noise amplified baseband signal to the reception data processor 895. The RF receiver 885 includes a first band first input terminal 885a connected to the first output terminal of the first band first RF switch 850, a second band first input terminal 885b connected to the first output terminal of the second band first RF switch 855, a first band second input terminal 855c connected to the single output terminal of the first band second RF switch 860 via the first BPF 870, a second band second input terminal 885d connected to the single output terminal of the second band second RF switch 865 via the second BPF 875, a first output terminal 885e for outputting the signals input through the first band first input terminal 885a and the second band first input terminal to the reception data processor 895 and a second output terminal 885f for outputting the signal input through the first band second RF switch 860 and the second band second RF switch 865.

The controller 899 controls general operations of the dual-band mobile terminal and signaling among internal components.

More particularly, the controller 899 controls general operations such that the first band signal and the second band signal are selectively input to the RF receiver 885 via the first diplexer 815 and the second diplexer 820. In order to obtain the diversity gain, the controller 899 selects the signal, of the signals input through the first and second incoming signal lines, having the high amplification gain or combines the signals input through the first incoming signal line and the second incoming signal line.

The SWC signal output to the RF switches 850, 855, 860 and 865 has characteristics of the graphs depicted in FIGS. 3 to 6.

When the mobile terminal 120 operates in the idle mode or the voice call mode, the controller 899 outputs the SWC signal for selecting one of the first band signal and the second band signal is selected to be input to the first band first input terminal 885a or the second band first input terminal 885b. At this time, the first output terminal of the first band first RF switch 850 connects the first duplexer 830 and the RF receiver 885, and the second band first RF switch 855 connects the second duplexer 835 and the RF unit 885.

Simultaneously, the controller 899 may output an SWC signal such that one of the first band signal and the second band signal input through the second incoming signal line is selected to be output to the first band second input terminal 885c or the second band second input terminal 885d of the RF receiver 885. In this case, the first band second RF switch 860 and the second band second RF switch 865 connect the second diplexer 820 and the RF receiver 885.

Otherwise, when the mobile terminal 120 operates in the data call mode, the controller 899 outputs the SWC signal, with which the signal input through the first incoming signal line is passed to the second RF switches 860 and 865, for determining a receipt of the incoming voice call. When the SWC signal is applied, the first band first RF switch 850 switches its input terminal from its first output terminal connected to the first band first input terminal 885*a* of the RF receiver 885 to its second output terminal connected to the first input terminal of the first band second RF switch 860 such that the first band signal received by the first antenna 805 is input to the first band second input terminal 885*c* of the RF receiver 885 via the first diplexer 815, the first duplexer 830, the first band first RF switch 850, the first band second RF switch 860 and the first BPF 870.

In a similar manner, when the SWC signal is applied, the second band first RF switch 855 switches its input terminal from its first output terminal connected to the second band first input terminal 885*b* of the RF receiver 885 to its second output terminal connected to the first input terminal of the second band second RF switch 865 such that the second band signal received by the first antenna 805 is input to the second band second input terminal 885*d* of the RF receiver 885 via the first diplexer 815, the second duplexer 835, the second band first RF switch 855, the second band second RF switch 865 and the second BPF 875.

Accordingly, the controller 899 may determine whether an incoming voice call is received based on the signals input through the first band second input terminal 885*c* and the second band second input terminal 885*d* of the RF receiver 885. If an incoming voice call is received, then the controller 889 pauses the current data call session and performs a voice call processing procedure. Otherwise, if no incoming voice call is received, then the controller 889 outputs the SWC signal periodically while maintaining the data call session.

As described above, the call processing method and apparatus for a mobile terminal according to exemplary embodiments the present invention enables a switch arranged between a duplexer and RF receiver switches to connect a first incoming signal line to a second incoming signal line, thereby determining a receipt of an incoming call periodically.

Also, the call processing method and apparatus for a mobile terminal according to the present invention allows a switch arranged between a duplexer and an RF receiver to change an incoming signal line and not change an outgoing signal line for determining an incoming voice call, thereby reducing power consumption caused by switching operation.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile terminal comprising:
    a Radio Frequency (RF) receiver comprising a first input terminal connected to a first incoming signal line, which is connected to a first antenna, and a second input terminal connected to a second incoming signal line, which is connected to a second antenna;
    a first RF switch arranged on the first incoming signal line for switching the first incoming line between the first input terminal and an inter-switch line;
    a second RF switch arranged on the second incoming signal line for switching the second input terminal between the second incoming signal line and the inter-switch line; and
    a controller for controlling, in a data call session, the first RF switch and the second RF switch to establish a connection of the first incoming signal line to the first input terminal and a connection of the second incoming signal line to the second input terminal, respectively, during a first period, and to establish a connection of the first incoming signal line to the second input terminal through the inter-switch line during a second period.

2. The mobile terminal of claim 1, wherein the controller determines whether an incoming voice call is received based on the signal input through the second input terminal during the second period.

3. The mobile terminal of claim 2, wherein the controller pauses the data call session and establishes a voice call session, when an incoming voice call is received.

4. The mobile terminal of claim 3, wherein the controller restarts the data call session, when the voice call session is completed.

5. The mobile terminal of claim 4, wherein the controller controls, in an idle mode or a voice call mode, the first RF switch to maintain the connection of the first incoming signal line to the first input terminal and controls the second RF switch to maintain the connection of the second incoming signal line to the second input terminal.

6. The mobile terminal of claim 1, further comprising a band pass filter arranged between the second antenna and the second RF switch for passing a preset band signal.

7. An incoming call processing method for a mobile terminal, the method comprising:
    establishing, in a data call session, a first connection of a first incoming signal line, which is connected to a first antenna, to a first input terminal of a Radio Frequency (RF) receiver via a first RF switch and a second connection of a second incoming signal line, which is connected to a second antenna, to a second input terminal of the RF receiver via a second RF switch, simultaneously during a first period;
    establishing a third connection by switching an output of the first incoming signal line from the first input terminal to an input of the second switch during a second period; and
    determining whether an incoming voice call is received based on a signal input through the second input terminal during the second period.

8. The method of claim 7, further comprising pausing the data call session and establishing a voice call session, when an incoming voice call is received.

9. The method of claim 8, further comprising restarting the data call session, when the voice call session is completed.

10. The method of claim 8, further comprising maintaining the first connection and the second connection in at least one of an idle mode and a voice call mode.

11. The method of claim 7, wherein the first incoming signal line is connected to a first antenna and the second incoming signal line is connected to a second antenna.

12. A mobile terminal comprising:
    a first diplexer and a second diplexer, each for separating a first band signal and a second band signal from a frequency band;
    a Radio Frequency (RF) receiver comprising a first band first input terminal and a second band first input terminal and a first band second input terminal and a second band second input terminal;
    a first band first RF switch for switching the first band signal input through a first incoming signal line connected to the first diplexer between the first band first input terminal and a first inter-switch line;
    a second band first RF switch for switching the second band signal input through the second incoming signal line connected to the first diplexer between the second band first input terminal and a second inter-switch line;

a first band second RF switch for switching the first band second input terminal between a third incoming signal line connected to the second diplexer and the first inter-switch line;

a second band second RF switch for switching the second band second input terminal between a fourth incoming signal line connected to the second diplexer and the second inter-switch line; and a controller for controlling, in a data call session, the first RF switches to establish connections of the first incoming signal lines and the second incoming signal line to the respective first input terminals and controls the second RF switches to establish connections of the third incoming signal line and the fourth incoming signal line to the respective second input terminals during a first period, and for controlling the first RF switches to establish connections of the first incoming signal line and the second incoming signal line to the respective second input terminals through the respective first inter-switch line and the second inter-switch line during a second period.

13. The mobile terminal of claim 12, wherein the controller determines whether an incoming voice call is received based on the first band signal and the second band signal input through the second input terminals during the second period.

14. The mobile terminal of claim 13, wherein the controller pauses the data call session and establishes a voice call session, when an incoming voice call is received.

15. The mobile terminal of claim 14, wherein the controller restarts the data call session, when the voice call session is completed.

16. The mobile terminal of claim 12, wherein the controller controls, in at least one of an idle mode and a voice call mode, the first RF switches to maintain the connections of the first incoming signal line and the second incoming signal line to the first input terminals and controls the second RF switches to maintain the connections of the third incoming signal line and the fourth incoming signal line to the second input terminals.

17. The mobile terminal of claim 12, wherein the first incoming signal line and the second incoming signal line are connected to a first antenna, and the third incoming signal line and the fourth incoming signal line are connected to a second antenna.

18. The mobile terminal of claim 12, wherein the first band signal comprises a Personal Communications System (PCS) band signal, and the second band signal comprises a cellular band signal.

19. The mobile terminal of claim 12, further comprising:
a first band path filter arranged between the first band second RF switch and the first band second input terminal of the RF receiver for passing a preset first band signal; and
a second band path filter arranged between the second band second RF switch and the second band second input terminal of the RF receiver for passing a preset second band signal.

* * * * *